Patented Mar. 2, 1954

2,671,100

UNITED STATES PATENT OFFICE 2,671,100

HYDROLYZABLE ORGANOSILYLETHYNES

Kurt C. Frisch, Pittsfield, Mass., and Robert B. Young, Schenectady, N. Y., assignors to General Electric Company, a corporation of New York No Drawing. Application March 15, 1952, Serial No. 276,873

11 Claims. (Cl. 260—448.2)

This invention is concerned with novel silicon compositions. More particularly, the invention relates to compositions of matter corresponding to the general formula I.    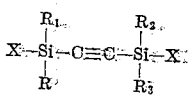

where R, $R_1$, $R_2$ and $R_3$ are monovalent hydrocarbon radicals free of acetylenic linkages; and X is a hydrolyzable group selected from the class consisting of halogens, acyloxy, and alkoxy groups. Among the values which R, $R_1$, $R_2$ and $R_3$ may be are, for instance, aliphatic, including lower alkyl radicals (e. g. methyl, ethyl, propyl, isopropyl, butyl, hexyl, dodecyl, etc.), and unsaturated aliphatic radicals (e. g., vinyl, allyl, methallyl, etc.); as well as cycloaliphatic radicals (e. g., cyclopentyl, cyclopentenyl, cyclohexyl, etc.); aryl radicals (e. g., phenyl, diphenyl, naphthyl, etc.); alkaryl radicals (e. g., tolyl, xylyl, ethylphenyl, etc.); alaykyl radicals (e. g., benzyl, phenylethyl, phenylbutyl, etc.); and their homologues. It will, of course, be understood by those skilled in the art that R, $R_1$, $R_2$ and $R_3$ may represent the same or different monovalent hydrocarbon radicals of the class described above.

Among the halogens which X may be are, for instance, chlorine, bromine, fluorine, etc. Acyloxy radicals which X may represent may be considered as having the structure II.    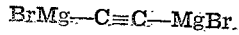

where Z is preferably a lower alkyl radical, for instance, methyl, ethyl, propyl, isopropyl, butyl, etc., radicals. If desired, Z may be any one of the monovalent hydrocarbon radicals for which R, $R_1$, $R_2$ and $R_3$ stand. Among the alkoxy radicals which X may be are, for instance, methoxy, ethoxy, propoxy, isobutoxy, etc., radicals; generally, the alkyl group in the alkoxy radical is preferably a lower alkyl group similar to that described for the acyloxy radicals.

The above-mentioned acetylenic silicon compositions may be prepared in various ways. Referring specifically to the preparation of compounds defined by Formula I where X is a halogen, one method for preparing such compositions which has been found particularly effective is to effect reaction between a Grignard reagent corresponding to the general formula III.    Y—Mg—C≡C—Mg—Y and a diorganodihalogenosilane where the organic groups which are silicon-bonded groups are the same as R, $R_1$, $R_2$ and $R_3$ described above, and the silicon-bonded halogens are, e. g., chlorine, bromine, fluorine, etc. The Y halogen in the Grignard reagent is preferably bromine and the halogen in the diorganodihalogenosilane described above is preferably chlorine. A particularly effective Grignard reagent is acetylene dimagnesium dibromide having the formula IV.    BrMg—C≡C—MgBr Generally, for each mol of acetylene dimagnesium dihalide, there is employed at least 2 mols of the diorganodihalogenosilane, for example, from 2 to 4 or more mols of the latter material. The reaction is preferably carried out in the presence of a catalyst, for instance, powdered cuprous chloride which is added to the ether solution of the acetylene dimagnesium dihalide. The reaction whereby the composition as herein described may be prepared may be considered as formed according to the following equation considering only the preparation of the hydrolyzable organosilylethynes shown in Formula I where X is a halogen, specifically chlorine.

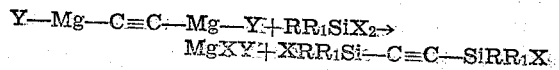

where R, $R_1$ and Y have the meanings given above. It will be apparent to those skilled in the art that instead of using R and $R_1$ in the diorganodihalogenosilane, the other monovalent hydrocarbon radicals, for instance, $R_2$ and $R_3$, may be substituted in place of one or both of the R, $R_1$. It is immaterial as to which monovalent hydrocarbon radical is employed in connection with the diorganodihalogenosilane since, as pointed out above, R, $R_1$, $R_2$ and $R_3$ may be the same or different monovalent hydrocarbon radicals.

Thereafter, the diorganodihalogenosilane is added to the ether solution and preferably stirred at room temperature for several hours and then heated for a period of time ranging from about 2 to 6 hours or more at the reflux temperature of the mass. The precipitate thus obtained is advantageously filtered from the salts formed, washed several times with organic solvents, e. g., diethyl ether, and the filtrate and washings fractionally distilled to give the desired product. Precaution should be observed that substantially anhydrous conditions are maintained throughout the reaction, starting with the time that the Grignard reagent and the diorganodihalogenosilane are employed in order to prevent undesirable hydrolysis of the silicon-bonded halogens which, as is known, hydrolyze quite readily, thus possibly interfering with the reaction and reducing the yield of the desired product.

Acetylene dimagnesium dibromide may be prepared by reacting ethyl magnesium bromide with dry acetylene for the necessary period of time, removing the excess acetylene by sweeping nitrogen through the raction mass, and separating the acetylene dimagnesium dibromide layer which is generally at the bottom. As is known to persons skilled in the art, the ethyl magnesium bromide may be prepared by reacting magnesium turnings in a large excess of ether with ethyl bromide.

The preparation of compounds corresponding to the formula

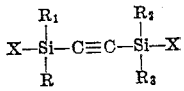

where X is either acyloxy or alkoxy radicals is carried out by using as one of the reactants the organoethynylhalogenosilanes of the formula

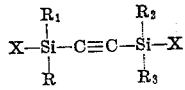

where X is a halogen. Thus, referring specifically to the preparation of the acyloxy derivative, one effects reaction between the organohalogenosilylethynes shown in Formula I where X is a halogen and an acid or preferably an acid anhydride, for instance, acetic acid, acetic anhydride, propionic anhydride, butyric anhydride, etc. If one employs, for example, acetic anhydride, the compounds obtained thereby will have the following general formula

V

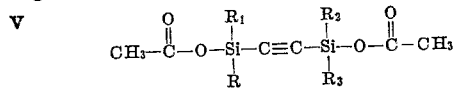

where R, $R_1$, $R_2$, and $R_3$ have the meanings assigned above. In reacting the organohalogenosilylethyne described immediately above with the acid anhydride, essentially equivalent molar amounts are advantageously employed. For example, we may use from about 1 mol of the organohalogenosilylethyne to 2 or more, for example, up to 4 or more, mols of the acid anhydride. Obviously, greater excesses of the acid anhydride may be employed for each mol of the organohalogenosilylethyne without departing from the scope of the present invention. We have found that the presence of a small amount of a catalyst such as, for example, a solution of the triethanolamine, in the acid anhydride markedly increases the rate of reaction and also gives a better yield of the acyloxy derivative. Generally, it is desirable to reflux the mixture of ingredients for a time ranging from about 1 to 4 hours, removing the low boiling material which may be present, and thereafter fractionally distilling the remainder of the reaction product to obtain the desired composition, namely, the organoacyloxysilylethyne.

The organohalogenosilylethyne corresponding to Formula I where X is a halogen, can also be used in preparing the organoalkoxysilylethynes of the same formula where X is an alkoxy group. One method which can be employed with advantage is to effect reaction between the organohalogenosilylethyne with a lower saturated aliphatic alcohol, for example, ethyl, propyl, isopropyl, butyl, etc., alcohols. Generally, mere refluxing of the organohalogenosilylethyne with the lower saturated aliphatic alcohol (advantageously in the presence or absence of a hydrohalide acceptor, for instance, a tertiary amine, such as pyridine) preferably in a molar amount equal to at least 2 mols of the alcohol per mol of the organohalogenosilylethyne are employed in order to get optimum yields of the organoalkoxysilylethyne; that is, compounds corresponding to the general formula

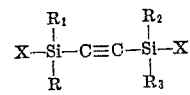

where X is an alkoxy radical and preferably the alkoxy groups are the same, although this is not necessary.

In order that those skilled in the art may better understand how the present invention may be practiced, the following examples are given by way of illustration and not by way of limitation. All parts are by weight.

*Example 1*

Ethyl magnesium bromide was prepared by adding 96.8 grams of magnesium turnings to 400 cc. ether and thereafter adding 436 grams ethyl bromide and 1200 cc. ether. This mixture was stirred thoroughly until it was evident that complete reaction had taken place to form the ethyl magnesium bromide Grignard reagent. This preparation of the Grignard reagent is well known to persons skilled in the art and requires no further details. Thereafter dry acetylene was passed through the Grignard solution for about 18 hours. At the end of this time nitrogen was used to sweep out the excess acetylene. At this point two layers had formed with the greenish-black acetylene dimagnesium dibromide at the bottom and the almost clear ether layer above. To the ether mixture of acetylene dimagnesium dibromide and ether described above was added 8 grams of powdered cuprous chloride. This addition proceeded with some heat evolution and the mixture had to be cooled. The resulting mixture was added gradually with stirring to a solution of 774 grams of dimethyldichlorosilane in 300 cc. of ether. A white precipitate formed. Thereafter the mixture was stirred and refluxed for 3½ hours. The formed precipitate was filtered and washed with ether, the filtrate and washings combined, and the ether solvent removed from the latter and the residual liquid subjected to fractional distillation under a vacuum. There was thus obtained a colorless liquid which distilled at 113° C. at 65 mm. and was identified as tetramethyldichlorodisilylethyne having the formula

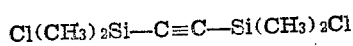

This compound was analyzed for silicon and found to contain 27.29% silicon (theoretical 26.54%).

*Example 2*

The compound prepared in Example 1, namely, tetramethyldichlorodisilylethyne, was hydrolyzed with an amount of water in excess of that required to effect complete hydrolysis of the two silicon-bonded chlorine atoms. There was thus obtained by hydrolysis in a saturated salt solution, a colorless liquid having a pleasant odor which is characteristic of silanols. This material was established to be tetramethylethynyldisilanediol having the formula

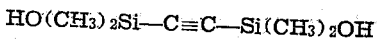
HO(CH₃)₂Si—C≡C—Si(CH₃)₂OH

Analysis of this compound showed it to contain 32.3% silicon as compared to the theoretical value of 32.2%.

*Example 3*

The compound tetramethyldiacetoxydisilylethyne can be prepared by effecting reaction between one molar equivalent of tetramethyldichlorodisilylethyne and acetic anhydride in the presence of a small amount of a solution of triethanolamine in acetic anhydride as a catalyst. The reaction mixture is preferably refluxed for a period of about 1 to 3 hours, the low boiling material then removed by fractional distillation, and the residual product vacuum-distilled until the desired composition is obtained. The compound tetramethyldiacetoxydisilylethyne has the formula

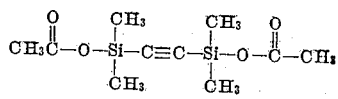

*Example 4*

The compound tetramethyldiethoxydisilylethyne having the formula

(C₂H₅O)(CH₃)₂Si—C≡C—Si(CH₃)₂(OC₂H₅)

may be prepared by effecting reaction between tetramethyldichlorodisilylethyne and ethyl alcohol in such molar proportion that preferably for each mol of the disilylethyne employed, at least 4, for instance, from about 4 to 6 mols, of ethyl alcohol are used. Generally, reaction takes place fairly promptly, but in order to increase the rate of reaction and to obtain optimum yield, it is desirable to heat the mixture of ingredients at the reflux temperature of the mass, preferably in the presence of a tertiary amine, such as pyridine, for a time ranging from about 1 to 3 hours, remove the unreacted ingredients and formed salts (e. g., by filtration), and thereafter fractionally distill the mixture to obtain the compound tetramethyldiethoxydisilylethyne.

It will be apparent to persons skilled in the art that other hydrolyzable organodisilylethynes may be prepared depending on the ingredients employed. Thus, referring specifically to the preparation of other types of organohalogenodisilylethynes, it will be apparent that various derivatives other than those disclosed in the examples above may be obtained by using different diorganodihalogenosilanes. Thus, when one employs, for instance, methylphenyldichlorosilane, the compound obtained by effecting reaction between the latter and the acetylene dimagnesium dibromide in the same manner as described above to give the compound dimethyldiphenyldichlorodisilylethyne having the formula

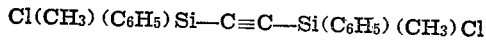
Cl(CH₃)(C₆H₅)Si—C≡C—Si(C₆H₅)(CH₃)Cl

Obviously, other diorganodihalogenosilanes may be employed as, for example, diethyldibromosilane, methylethyldichlorosilane, methylbenzyldifluorosilane, ethyl tolyldichlorosilane, etc.

Various tetraorganodiacyloxydisilylethynes may also be prepared by employing different tetraorganodihalogenodisilylethynes with various saturated aliphatic acids or anhydrides. Thus, among the acyloxy derivatives which may thus be obtained are, for example, those in which the acyloxy radical is propionoxy, butyroxy, etc. By varying the molar concentrations, it is possible to obtain different acyloxy groups bonded to the silicon atom by oxygen. However, no particular advantage is derived by mixing the type of acyloxy radicals and it is therefore believed desirable that the silicon-bonded acyloxy groups be the same.

Just as the tetraorganodiacyloxydisilylethynes may be varied depending on the particular tetraorganodihalogenodisilylethyne employed and the particular acid or anhydride used, in the same manner various tetraorganodialkoxysilylethynes may be prepared by varying the former ingredient as well as the lower saturated aliphatic alcohol which is employed. Thus, instead of obtaining, as was done in Example 4, ethoxy derivatives, by the same method one may obtain derivatives thereof in which the alkoxy radicals are methoxy, propoxy, isopropoxy, etc., radicals, depending on whether one employs methyl alcohol, propyl alcohol, isopropyl alcohol, etc., respectively, for reaction with the tetramethyldichlorodisilylethyne. Obviously, instead of tetramethyl derivatives, one may also obtain other types of alkoxy-substituted tetraorganodisilylethynes, depending on the type of ingredients used to make the tetraorganodihalogenodisilylethynes. Examples of other tetraorganodialkoxydisilylethynes which may be employed in accordance with the practice of the present invention may be mentioned, for example, tetraethyldimethoxydisilylethyne,

CH₃O)(C₂H₅)₂Si—C≡C—Si(C₂H₅)₂(OCH₃)

dimethyldiphenyldipropoxydisilylethyne having the formula

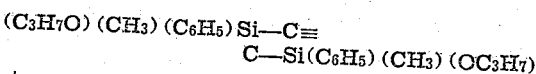
(C₃H₇O)(CH₃)(C₆H₅)Si—C≡C—Si(C₆H₅)(CH₃)(OC₃H₇)

etc.

The acetylenic silicon derivatives herein disclosed and claimed are useful as starting materials for making various polymeric compositions. Thus, these compositions may be polymerized with various polymerization catalysts, for example, benzoyl peroxide, etc., to make polymers having utility as insulating or dielectric media. In addition, derivatives from these materials may be made by reaction of the acetylenic silicon compositions with various reactive materials capable of adding across the acetylenic triple bond. Thus, the compositions may be hydrogenated to give olefinic or paraffinic derivatives, depending on the degree of hydrogenation. In addition, hydrogen halides may also be added across the triple bond to completely saturate the latter bond or to add only one molecule of hydrogen halide. Introduction of hydrogen halide adds an additional functional group, namely, a halogen atom, to the compound. Moreover, halogenation of the acetylenic silicon compositions may be carried out by subjecting the above-described material to reaction with a halogen, for example, chlorine, fluorine, etc., whereby part or all of the unsatisfied valence bonds of the triple bond may be saturated with halogen.

Organic acids, alcohols, acid chlorides, ammonia, amines may also be added across the triple bond to give new derivatives in addition to the type of derivatives in which the addition of some of the previously mentioned compositions may cause reaction with the silicon-bonded hydrolyzable group. Other silicon compositions, particularly silicon compositions containing a silicon-bonded hydrogen and a silicon-bonded halogen, for example, silicocholoroform and methyldichlorosilane, may be added across the triple bond to give it additional silicon substitution. Finally, such other materials as hydrogen sulfide, mercaptans, HCN, organic nitriles, etc., may also be added to make new derivatives.

The above-described acetylenic silicon compositions can also be copolymerized with various materials including styrene, butadiene, vinyl chloride, vinyl acetate, various acrylates and methacrylates, acrylonitrile, etc., to form new and useful polymeric materials. The ability to polymerize across the triple bond or double bond, in the case of addition compounds, is important for silicone polymers in order to obtain a faster cure for silicone rubbers or quicker drying time for silicone varnishes.

One of the advantages of the tetraorganodisilylethynes containing silicon-bonded hydrolyzable groups is the fact that these materials can be hydrolyzed, for instance, with water, to give either the diols or they can be further polymerized after formation of the diol to siloxane polymers in which there is present the disilylethyne linkage. Thus, complete hydrolysis of the compound tetramethyldichlorodisilylethyne with water and dehydration of the silanols to the siloxane stage would give polymeric compositions having the structural unit

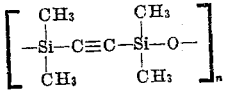

where $n$ is an integer greater than 1. Such materials can be useful in making silicone oils or can be further condensed, either alone or with other organosiloxy units to make rubbers and resins which have good heat stability and can be of added interest because of the increased functionality due to the presence of the acetylenic triple bond. Small amounts of the siloxane material described above can be used as additives for other unsaturated silicone resins containing silicon-bonded saturated hydrocarbon groups which can be copolymerized or which can be converted more readily to the substantially infusible and insoluble state.

What we claim as new and desire to secure by Letters Patent of the United States is:

1. A composition corresponding to the general formula

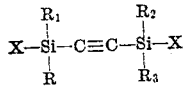

where R, $R_1$, $R_2$ and $R_3$ are monovalent hydrocarbon radicals selected from the class consisting of alkyl, phenyl, diphenyl, naphthyl, alkaryl, aralkyl, vinyl, allyl, methallyl, and cycloaliphatic radicals and X is a hydrolyzable group selected from the class consisting of halogens, acyloxy and alkoxy radicals.

2. Tetramethyldichlorodisilylethyne.
3. Dimethyldiphenyldichlorosilylethyne.
4. Tetraphenyldichlorodisilylethyne.
5. Tetramethyldiacetoxydisilylethyne.
6. Tetramethyldiethoxydisilylethyne.
7. The process of making compositions corresponding to the general formula

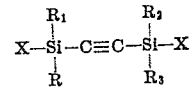

where R, $R_1$, $R_2$ and $R_3$ are each monovalent hydrocarbon radicals selected from the class consisting of alkyl, phenyl, diphenyl, naphthyl, alkaryl, aralkyl, vinyl, allyl, methallyl, and cycloaliphatic radicals and X is a hydrolyzable group selected from the class consisting of halogens, acyloxy and alkoxy radicals, which process comprises reacting a Grignard reagent corresponding to the general formula

with a diorganodihalogenosilane wherein Y is a halogen, and the organic groups in the diorganodihalogenosilane are monovalent hydrocarbon radicals similar to those described for R, $R_1$, $R_2$ and $R_3$.

8. The process which comprises reacting dimethyldichlorosilane with acetylene dimagnesium bromide, thereby to produce tetramethyldichlorodisilylethyne.

9. The process which comprises reacting tetramethyldichlorodisilylethyne with ethyl alcohol, thereby to produce tetramethyldiethoxydisilylethyne.

10. The process which comprises reacting tetramethyldichlorodisilylethyne with acetic anhydride, thereby to produce tetramethyldiacetoxydisilylethyne.

11. The process which comprises reacting tetramethyldichlorodisilylethyne with a composition selected from the class consisting of ethyl alcohol and acetic anhydride thereby to produce a dihydrolyzable tetramethyldisilylethyne containing two silicon-bonded hydrolyzable groups.

KURT C. FRISCH.
ROBERT B. YOUNG.

References Cited in the file of this patent

UNITED STATES PATENTS

| Number | Name | Date |
| --- | --- | --- |
| 2,082,569 | Carothers | June 1, 1947 |
| 2,551,924 | Boldebuck | May 8, 1951 |

OTHER REFERENCES

Volnov et al., "Jour. Gen. Chem." (USSR), vol. 10, pp. 1600–1604.

Feiser et al., "Organic Chemistry" (1944), page 78. Heath and Co., publishers, Boston, Mass.

Rochow, "Chemistry of the Silicones" (1946), page 14, Wiley and Son, publishers, New York.